(12) United States Patent
Chu

(10) Patent No.: US 7,502,870 B1
(45) Date of Patent: Mar. 10, 2009

(54) METHOD FOR RECEIVING NETWORK COMMUNICATION AND APPARATUS FOR PERFORMING THE SAME

(75) Inventor: Hsiao-Keng Jerry Chu, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 896 days.

(21) Appl. No.: 10/917,995

(22) Filed: Aug. 13, 2004

(51) Int. Cl.
*G06F 15/16* (2006.01)
*G06F 12/00* (2006.01)

(52) U.S. Cl. .................................. 709/250; 709/230
(58) Field of Classification Search ............... 709/250, 709/230, 217, 218
See application file for complete search history.

(56) References Cited

U.S. PATENT DOCUMENTS

| | | | | |
|---|---|---|---|---|
| 6,334,153 B2 * | 12/2001 | Boucher et al. | ............. | 709/230 |
| 6,393,487 B2 * | 5/2002 | Boucher et al. | ............. | 709/238 |
| 6,757,746 B2 * | 6/2004 | Boucher et al. | ............. | 709/250 |
| 2003/0227933 A1 * | 12/2003 | Eberle et al. | ................. | 370/419 |
| 2004/0095883 A1 * | 5/2004 | Chu et al. | ................... | 370/235 |

\* cited by examiner

*Primary Examiner*—Zarni Maung
(74) *Attorney, Agent, or Firm*—Martine Penilla & Gencarella, LLP

(57) ABSTRACT

A host memory location pointer is posted from a host device to a network interface card (NIC) attached to the host device prior to receipt at the NIC of data to be placed in the host memory location corresponding to the pointer. Posting the host memory location pointer serves to surrender ownership of the host memory location from the host device to the NIC. Data received at the NIC is placed in the host memory location corresponding to the pointer. Furthermore, the NIC operates to prevent placement of the data in a portion of the host memory where data has been previously placed by the NIC. Also, the host device operates to re-assume ownership of the portion of the host memory having data placed therein by the NIC without actively reclaiming ownership of the portion of the host memory location from the NIC.

10 Claims, 7 Drawing Sheets

METHOD FOR RECEIVING NETWORK COMMUNICATION AND APPARATUS FOR PERFORMING THE SAME

BACKGROUND

Conventionally, random memory locations are allocated within a host device for use as temporary storage for incoming data received from a network. Allocation of these random memory locations is generally handled at a low level within a networking architecture. Conversely, allocation of the appropriate memory locations representing the final destination for the incoming data is handled at a high level within the networking architecture. Therefore, in conventional networking operations, when a host device receives data through a network communication, the data is first placed at random locations within the host memory. Subsequently, the data is copied from the random memory locations to the appropriate locations within the host memory. Thus, in conventional networking operations, data arriving from the network needs to be copied at least once prior to placement in the appropriate location in the host memory. These copy operations consume valuable host processor cycles that could otherwise be used for more productive functions.

SUMMARY

It should be appreciated that the present invention can be implemented in numerous ways, such as a process, an apparatus, a system, a device or a method on a computer readable medium. Several inventive embodiments of the present invention are described below.

In one embodiment, a method for receiving network communication is disclosed. The method includes posting a host memory location pointer from a host device to a network interface card (NIC) attached to the host device. The host memory location pointer is posted prior to receipt at the NIC of data to be placed in the host memory location corresponding to the pointer. Also, posting the host memory location pointer serves to surrender ownership of the host memory location from the host device to the NIC. The method also includes placing the data received at the NIC in the host memory location corresponding to the pointer. Furthermore, the NIC is operated to prevent placement of the data in a portion of the host memory where data has been previously placed by the NIC. Also, the method includes operating the host device to re-assume ownership of the portion of the host memory having data placed therein by the NIC without actively reclaiming ownership of the portion of the host memory location from the NIC.

In another embodiment, a method for receiving network communication in accordance with a message-based transport protocol is disclosed. The method includes posting a host memory location pointer from a host device to a NIC attached to the host device. The host memory location pointer is posted prior to receipt at the NIC of data to be placed in the host memory location corresponding to the pointer. Also, posting the host memory location pointer serves to surrender ownership of the host memory location from the host device to the NIC. The method also includes placing the data received at the NIC in the host memory location corresponding to the pointer. The method further includes operating the NIC to identify an end of data marker associated with the data received at the NIC. In response to identifying the end of data marker, the method requires that the NIC be operated to automatically surrender ownership of the host memory location to the host device. Thus, the automatic surrender of ownership of the host memory location from the NIC to the host device allows the host device to avoid actively reclaiming ownership of the host memory location from the NIC.

In another embodiment, a method for handling an underrun condition in network communication is disclosed. The method includes operating a NIC to recognize an absence of a memory location pointer in the NIC, wherein the memory location pointer corresponds to an application allocated memory location. The memory location pointer is to be used for placement of a data packet received at the NIC in a memory of a host device to which the NIC is attached. The method also includes operating the NIC to place the received data packet at a random memory location in the host memory. The method further includes operating the NIC to set an out-of-order condition flag in the host device in response to having recognized the absence of the memory location pointer and having placed the received data packet at the random memory location. Additionally, the host device is operated to copy the data packet from the random memory location in the host memory to a required memory location corresponding to the memory location pointer absent in the NIC.

In another embodiment, a method for receiving network communication is disclosed. The method includes tracking a highest data packet sequence number received by a NIC. The method also includes recognizing an attempt by a host device, to which the NIC is attached, to post an invalid memory location pointer to the NIC, wherein the invalid memory location pointer corresponds to a data packet sequence number that is less than or equal to the highest data packet sequence number received by the NIC. Also in the method, the NIC is operated to disregard the recognized attempt by the host device to post the invalid memory location. Furthermore, the NIC is operated to set an out-of-order condition flag in response to recognizing the attempt by the host device to post the invalid memory location pointer to the NIC.

In another embodiment, a NIC is disclosed. The NIC includes circuitry configured to track a highest data packet sequence number received by the NIC. The NIC also includes circuitry configured to recognize an attempt by a host device to which the NIC is attached to post an invalid memory location pointer to the NIC. The invalid memory location pointer corresponds to a data packet sequence number that is less than or equal to the highest data packet sequence number received by the NIC. The NIC further includes circuitry configured to disregard the recognized attempt by the host device to post the invalid memory location pointer to the NIC. Additionally, the NIC includes circuitry configured to set an out-of-order condition flag in response to recognizing the attempt by the host device to post the invalid memory location pointer to the NIC.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
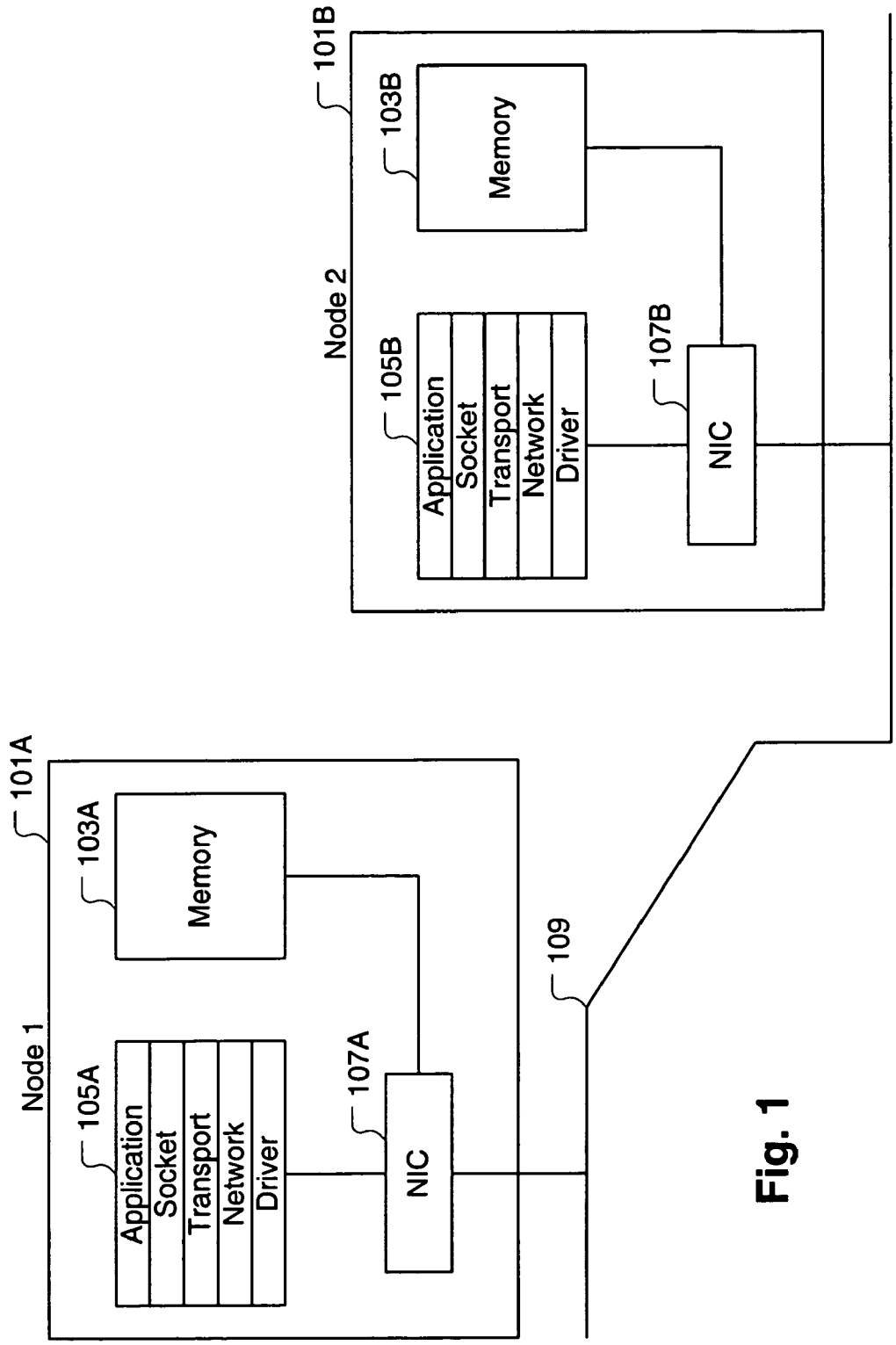
FIG. 1 is an illustration showing an exemplary communication network, in accordance with one embodiment of the present invention.

FIG. 1 is an illustration showing an exemplary communication network, in accordance with one embodiment of the present invention. The network includes a first node 101A and a second node 101B connected through a network medium 109. The first node 101A includes a protocol stack 105A, a memory 103A, and a network interface card (NIC) 107A. Similarly, the second node 101B includes a protocol stack 105B, a memory 103B, and a NIC 107B. Each NIC 107A and 107B serves to connect its respective node, 101A and 101B, to the network medium 109. In various embodiments, the network medium 109 can be defined in accordance with a wireless network, a physical network, or a combination thereof, as known to those skilled in the art. Each NIC 107A and 107B is also connected to communicate directly with its respective node's memory, 103A and 103B. Furthermore, each NIC 107A and 107B is connected to communicate with a lowest level of its respective node's protocol stack, 105A and 105B. It should be appreciated that each node 101A/101B in the exemplary communication network of FIG. 1 can include a number of other components not explicitly shown. For example, each node includes a processor. Additionally, each node can include other common computer components and peripheral devices, such as storage components, display components, user interface components, etc.

Each protocol stack 105A and 105B is defined by a number of protocol layers. Each protocol layer represents a set of predefined rules for governing various networking operations. Protocols present at each layer define a distinct level of capability and service. Also, protocols present at each layer build upon protocols at lower levels and provide support for protocols at upper levels. In the exemplary embodiment of FIG. 1, each protocol stack 105A and 105B includes, from bottom to top, a driver layer, an network layer, a transport layer, a socket layer, and an application layer. It should be appreciated that the protocol stack of FIG. 1A represents one of many possible network protocol stack configurations. Also, it should be understood that the principles of the present invention as described herein can be equally applied regardless of the specific network protocol stack configuration. However, for purposes of discussion, the present invention will be described with respect to the exemplary network protocol stack of FIG. 1.

The application layer of the protocol stack 105A/105B provides services for applications executing on the respective node. The application layer protocols are the primary interface between the applications executing on the node and the network. Generally speaking, the application layer protocols provide access or handling services for a process accessing the network. The access or handling services can be directory-based, file-based, or message-based. Examples of application layer protocols include: CMIP (common management information protocol), SNMP (simple network management protocol), FTAM (file transfer, access, and management), FTP (file transfer protocol), NFS (network file system), RFS (remote file system), X.400, SMTP (simple mail transfer protocol), and Telnet. Those skilled in the art will recognize and appreciate the details of each of the above-mentioned application layer protocol examples. It should be understood that the principles of the present invention as described herein can be equally applied regardless of the specific application layer protocol.

The socket layer of the protocol stack 105A/105B provides functionality for maintaining, synchronizing, and sequencing the dialog in a network connection. For example, the socket layer protocols generally allow two nodes to establish a reliable connection for data transfer. Also, the socket layer protocols can include capabilities for monitoring sessions to ensure they are running smoothly. The socket layer protocols operate to define a network connection by establishing a path between two sockets. In network communication, a socket includes a port and a network address of the node on which the port is located. Each socket represents a logical entity through which an application communicates with a network. Examples of socket types include: a datagram socket, a stream socket, a raw socket, and a dynamically assigned socket (DAS). Those skilled in the art will recognize and appreciate the details of each of the above-mentioned socket type examples. It should be understood that the principles of the present invention as described herein can be equally applied regardless of the specific socket layer protocol.

The transport layer represents a dividing layer within the protocol stack 105A/105B. The transport layer is positioned between upper layers of the protocol stack that are strongly application-dependent and lower layers of the protocol stack that are strongly network-dependent. When operating at a sending node where data packets are being passed down the layers of the protocol stack, the transport layer ensures that data packets are sent off in the proper sequence and format. When operating at a receiving node where data packets are being passed up the layers of the protocol stack, the transport layer ensures that data packets are received in the proper sequence and format. Examples of transport layer protocols include: TCP (transmission control protocol), UDP (user datagram protocol), SPX (sequenced packet exchange), PEP (packet exchange protocol), VOTS (VAX OSI transport service), AEP (AppleTalk echo protocol), ATP (AppleTalk transaction protocol), NBP (name building protocol), and RTMP (routing table maintenance protocol). Those skilled in the art will recognize and appreciate the details of each of the above-mentioned transport layer protocol examples. It should be understood that the principles of the present invention as described herein can be equally applied regardless of the specific transport layer protocol.

The network layer of the protocol stack 105A/105B is responsible for controlling the flow of data from sender to receiver on the network. The network layer represents the layer at which routing decisions are made and carried out. Generally, the network layer protocols are not defined to guarantee delivery of the data successfully. One example of a network layer protocol is the internet protocol (IP). The IP provides directionless, best-effort delivery of data packets between nodes. The term directionless means that data packets do not necessarily follow the same path when traveling between their source node and their destination node. The term best-effort means that there is no guarantee that data packets will be delivered in the correct order, or at all. Those skilled in the art will recognize and appreciate the details of the IP. Also, those skilled in the art will recognize the existence of other network layer protocols not explicitly mentioned herein. It should be understood that the principles of the present invention as described herein can be equally applied regardless of the specific network layer protocol.

At the bottom layer of the protocol stack 105A/105B, the driver layer is defined to provide network access to applications executing on the node. The driver layer protocol is the interface between the application programs and the physical network. In general the driver layer protocols provide the NIC with the bytes to be transmitted onto the network. Furthermore, the driver layer ensures compatibility between the NIC and the upper layer protocols. Examples of NIC drivers that can be embodied in the driver layer include: NDIS (network driver interface specification) and ODI (open data-link interface). Those skilled in the art will recognize and appreciate the details of each of the above-mentioned driver layer protocol examples. It should be understood that the principles of the present invention as described herein can be equally applied with essentially any driver layer protocol that is compatible with the NIC 107A/107B and the overlying network layer protocol.

The present invention is primarily focused on events that occur at a node of the network involved in receiving data packets. Therefore, the remainder of the discussion will be directed to activities that are performed at a receiving node of the network. For discussion purposes, consider that the first node 101A from FIG. 1 is acting as a receiving node on the network.

Figure 2:
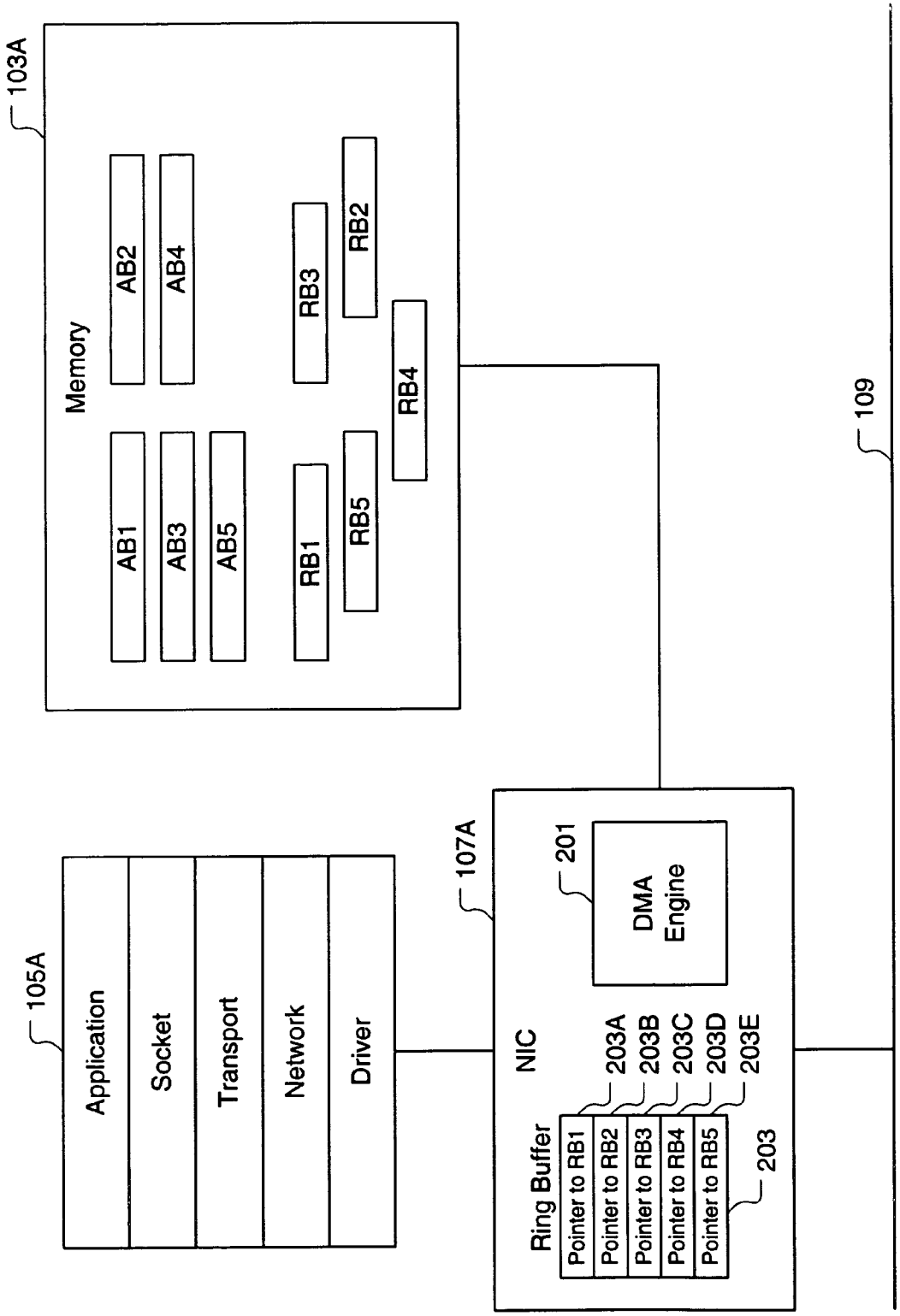
FIG. 2 is an illustration showing a more detailed view of the first node acting as a receiving node on the network, in accordance with one embodiment of the present invention.

FIG. 2 is an illustration showing a more detailed view of the first node 101A acting as a receiving node on the network, in accordance with one embodiment of the present invention. As previously discussed, the first node 101A includes the NIC 107A connected to each of the network medium 109, the protocol stack 105A, and the memory 103A. Conventionally, the NIC 107A includes a ring buffer 203 and a direct memory access (DMA) engine 201. The ring buffer 203 is represented by a number of registers 203A-203E defined to operate in a first-in-first-out (FIFO) manner. Therefore, at a given instance in time, one register of the ring buffer 203 will be identified as the head register and one register will be identified as the tail register. The head register is accessed when data is to be withdrawn from the ring buffer 203. Data to be placed in the ring buffer 203 is placed in the register following the tail register. As data is withdrawn from and placed in the ring buffer, the specific registers representing the head register and the tail register adjust such that the ring buffer 203 operates in the FIFO manner.

The ring buffer 203 is used to store pointers to locations in the memory 103A of the host device to which the NIC 107A is attached. As data packets are received by the NIC 107A from the network medium 109, the DMA engine 201 operates to place the incoming data packets in the memory locations stored in the ring buffer 203. Conventionally, the ring buffer 203 is loaded with pointers to random memory locations in the host memory 103A. For example, FIG. 2 shows ring buffer registers 203A-203E storing pointers to random buffer locations RB1-RB5, respectively. The random buffer locations corresponding to RB1-RB5 are depicted in the memory 103A. As each data packet arrives at the NIC 107A, the DMA engine 201 operates to placed the data packet at the memory location corresponding to the pointer stored in the head register of the ring buffer 203. Also, once the head register value is used, i.e., consumed, for placement of an incoming data packet, a register following the consumed head register in the ring buffer 203 is specified as the new head register in accordance with the FIFO manner of operation. Thus, the first five data packets received by the NIC 107A will be placed in random buffer locations RB1, RB2, RB3, RB4, and RB5, respectively.

After each pointer in the ring buffer 203 is consumed by the NIC 107A to place an incoming data packet, the register containing the consumed pointer needs to be updated to contain a new pointer. The new pointer needs to be stored in the register before the NIC 107A traverses the ring buffer 203 and needs to access the register again. Thus, as data packets arrive and get placed in the host memory 103A by the NIC 107A, the consumed registers of the ring buffer 203 are updated with a fresh pointer to a new random memory location. The driver layer protocol has responsibility for writing the random memory location pointers to the ring buffer 203.

Once the data packets are placed in the random memory locations by the NIC 107A, the transport layer protocols operate to copy the data packets from their random memory locations, RB1-RB5, to appropriate memory locations allocated by the application layer, AB1-AB5. Copying the data packets from the random memory locations to the appropriate memory locations involves a substantial number of host device processor cycles. In order to avoid expenditure of these host device processor cycles, it is desirable to avoid having to copy the data packets from the random memory locations to the appropriate memory locations as allocated by the application layer. One approach for avoiding this copy of data packets involves operating the NIC 107A to place the incoming data packets directly into their appropriate memory locations as allocated by the application layer. This approach, however, presents a number of challenges addressed by the present invention.

Figure 3:
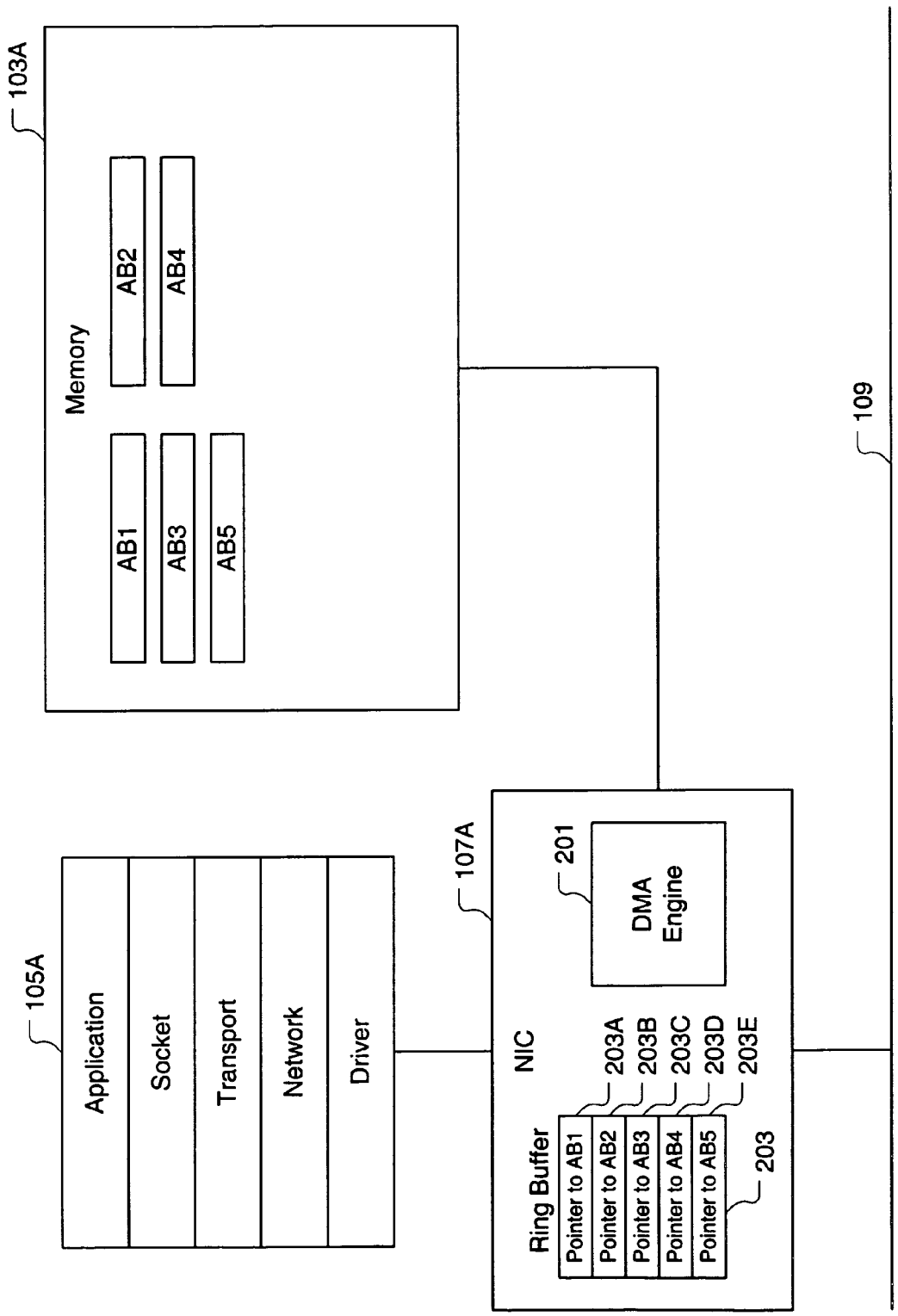
FIG. 3 is an illustration showing the first node operating to avoid having to perform of a received side copy of incoming data, in accordance with one embodiment of the present invention.

FIG. 3 is an illustration showing the first node 101A operating to avoid having to perform of a received side copy of incoming data, in accordance with one embodiment of the present invention. More specifically, data packets that are received from the network medium 109 by the NIC 107A are placed directly into the appropriate memory locations as allocated by the application layer protocol. To accomplish this direct placement of incoming data packets, pointers to the appropriate memory locations AB1-AB5 are passed downward from the application layer of the protocol stack 105A to the ring buffer 203 of the NIC 107A. The process of passing the application allocated buffer locations all the way down the protocol stack 105A to the NIC 107A is referred to as pre-posting of application buffers to the NIC 107A.

Once the application buffers are pre-posted to the ring buffer 203 of the NIC 107A, the DMA engine 201 operates to place incoming data packets in the host memory 103A locations corresponding to the pointers stored in the registers 203A-203E of the ring buffer 203. Also, as previously described with respect to FIG. 1, the ring buffer 203 is operated in a FIFO manner. Thus, in accordance with the foregoing, pre-posting of application buffers to the NIC 107A enables placement of incoming data packets into appropriate host memory locations, as allocated by the application, without having to perform memory copy operations. Also, when buffers are pre-posted to the NIC 107A, ownership of the respective buffers is also passed to the NIC 107A. Thus, when the application pre-posts a buffer to the NIC 107A, the application yields ownership of the buffer to the NIC 107A. The application is required to regain ownership of the buffer from the NIC 107A in order to further manage the data placed in the buffer by the NIC 107A.

Pre-posting application buffers to the NIC 107A provides as attractive solution for avoiding or minimizing receive side copy of incoming data. However, pre-posting of application buffers also presents some challenges. Once such challenge is associated with size differences between application allocated buffers and conventional NIC buffer sizes. NICs usually allocate and manage buffers of a network maximum transfer unit (MTU) size. For example, a common MTU for Ethernet is 1500 bytes. Applications, however, allocate and manage buffers of a system page size. One popular system page size is 8192 bytes. Therefore, a discrepancy often exists between the buffer size that the NIC is configured to manage and the buffer size allocated by the application. As will be discussed below, this discrepancy can potentially cause buffer management difficulty.

For NICs, the management of MTU size buffers is easy and natural. Each arriving data packet will occupy one buffer. When an end of Ethernet frame is detected, the buffer will be considered complete. Once the buffer is complete, the NIC will automatically return ownership of the buffer to the application to be managed as deemed necessary by the application. When buffers of system page size are pre-posted to the NIC by the application, however, the NIC is required to manage buffers of unfamiliar size. Consequently, the NIC needs to rely on something other than an end-of-link layer frame to determine when a buffer is completed. It is important for the NIC to be able to determine on its own when a buffer is completed in order to know when to return ownership of the buffer to the application from which the buffer was pre-posted. Otherwise, the application must perform a buffer reclamation process to reacquire ownership of the buffer. The buffer reclamation process can be expensive in terms of host processor cycles consumed. An increased processor load associated with performing buffer reclamation processes can diminish processor load savings associated with pre-posting the application buffers to avoid the receive side copy operations.

As the NIC operates to place incoming data packets into the pre-posted application buffers, the NIC will automatically return ownership of each buffer to the application when the buffer is filled, i.e., completed. However, buffer ownership becomes an issue when a buffer is left partially filled by incoming data. A partially filled buffer can be caused by a variety of conditions. For example, at the end of the network communication, the final data packet may only fill a portion of a buffer. The present invention provides a method by which partially filled buffer ownership can be resolved.

In accordance with the present invention, the NIC is configured to operate in accordance with both a message-based transport protocol, e.g., UDP, and a byte-stream oriented transport protocol, e.g., TCP. When operating in accordance with the message-based transport protocol, the NIC is configured to recognize a message boundary such as an end-of-data marker. Upon recognition of the message boundary, the NIC is further configured to complete the current buffer by automatically returning ownership of the buffer to the application. Thus, when receiving a message-based network communication, the NIC is configured to automatically return ownership of each buffer to the application either upon completion of the buffer or upon recognition of a message boundary. Therefore, when operating the NIC of the present invention to receive a message-based network communication, the application is not required to actively reclaim ownership of buffers from the NIC. Consequently, host processor cycles are saved by avoiding the receive side memory copy of incoming data and avoiding the need for buffer reclamation.

When operating in accordance with the byte-stream transport protocol, the NIC is configured to place each incoming data packet in a separate application buffer. Also, the application layer protocol and the NIC are each defined to manage buffer ownership on a byte-level, rather than a buffer level. As incoming data is placed in memory by the NIC, the application layer protocol operates to assume ownership of data that has been placed in the memory by the NIC. The assumption of ownership by the application layer protocol is performed on a byte-level basis. Thus, as the NIC fills a buffer in the host memory, the application is capable of assuming ownership of each byte of data that is placed in the buffer. The assumption of byte-level ownership by the application layer protocol can be performed in accordance with essentially any schedule required by the application. However, the application is not permitted to assume ownership of a portion of a buffer that has been pre-posted to the NIC, but has not yet been filled with data by the NIC.

To support the byte-level assumption of buffer ownership by the application, the NIC is configured to only fill buffers in a forward direction. The NIC operates as if it retains ownership of the entire pre-posted buffer until the buffer is completely filled, at which point the NIC automatically returns ownership of the entire buffer to the application. However, since the NIC is not capable of filling buffers in a reverse direction, byte-level buffer ownership conflicts between the application and NIC are avoided. For example buffer ownership conflict is avoided when the application assumes ownership of a buffer portion that has already been filled by the NIC, wherein the NIC continues to fill the same buffer with data in the forward direction.

Provision for byte-level buffer ownership by the present invention renders moot the issue associated with buffer size discrepancies between the application and the NIC. More specifically, as data packets are received by the NIC, the NIC operates to place each received data packet in the appropriate pre-posted application buffer. Since the application automatically assumes byte-level ownership of buffers that have been filled by the NIC, it is not necessary for the NIC to monitor the end of data for the purpose of returning buffer ownership to the application.

Another challenge associated with pre-posting application buffers to the NIC to avoid or minimize receive side copy of incoming data is associated with ensuring that the data packets are placed in the correct buffer locations in host memory. Since data packets can be received out of sequence by the NIC, it is necessary to ensure that data packets are ordered correctly when placed in the host memory. The present invention provides a method by which incoming data packets can be managed to ensure proper ordering when placed in the host memory by the NIC.

For an ordered data transport, the NIC hardware/software is configured to ensure that buffers are not posted for data packets that previously arrived at the NIC. The NIC of the present invention enforces this rule by monitoring the highest data packet sequence number that has arrived at the NIC from the network. The NIC further operates to reject attempts to pre-post application buffers that correspond to a data packet sequence number that is less than or equal to the highest data packet sequence number that has previously arrived at the NIC. Also, if a data packet arrives at the NIC having a sequence number less than or equal to the highest data packet sequence number that has previously arrived at the NIC, the arriving data packet is processed through a backup path. The backup path generally corresponds to the previously described approach in which the data packet is placed in a random location in the host memory and then copied to the correct location in host memory. The protocol stack is defined to detect when a data packet has been processed through the backup path. The protocol stack includes logic to copy the data packet transmitted through the backup path from the random location in memory to the correct application buffer.

The backup path is also used when an under-run condition occurs. The under-run condition occurs when a buffer of an incoming data packet has not been pre-posted to the NIC prior to arrival of the incoming data packet. It should be further appreciated that the method of present invention, for rejecting an attempt to pre-post an application buffer that corresponds to a data packet sequence number that is less than or equal to the highest data packet sequence number that has previously arrived at the NIC, will also resolve an attempt to post an under-run initiating application buffer to the NIC. Also, with the present invention, the application retains ownership of application buffers whose data packet is processed through the backup path, thus avoiding a need for the application to reclaim these buffers from the NIC. Various aspects of the present invention are further described below with respect to FIGS. 4 through 7.

Figure 4:
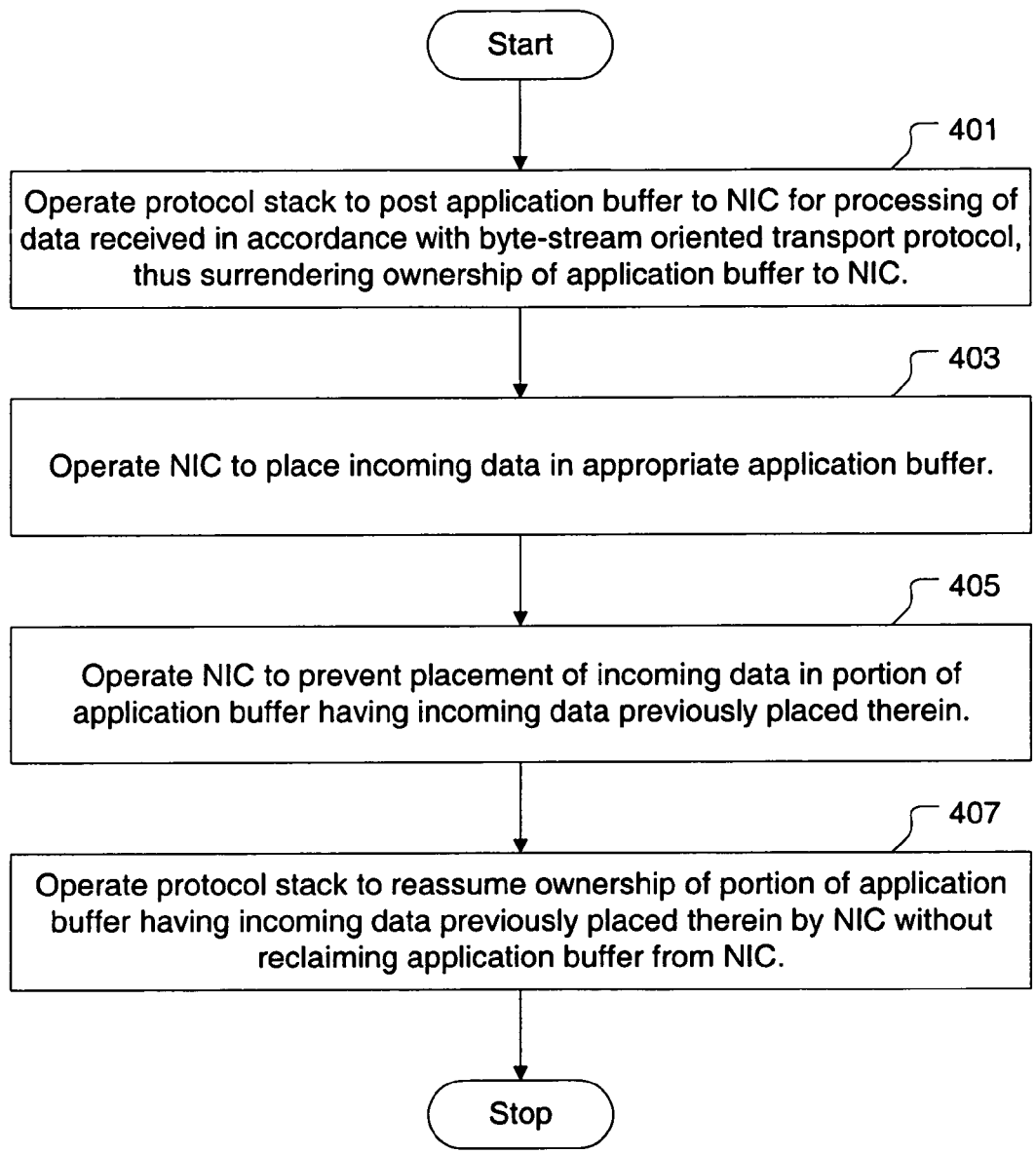
FIG. 4 is an illustration showing a flowchart of a method for receiving network communication, in accordance with one embodiment of the present invention.

FIG. 4 is an illustration showing a flowchart of a method for receiving network communication, in accordance with one embodiment of the present invention. The method includes an operation 401 in which a protocol stack of a host device operates to post an application buffer to a NIC, wherein the application buffer represents a pointer to a host memory location. In one embodiment, the application buffer is allocated by an application executing on the host device. The application buffer is to be used for processing a data packet to be received by the NIC in accordance with a byte-stream oriented transport protocol. Posting of the application buffer serves to surrender ownership of the corresponding host memory location from the host device to the NIC. Posting of the application buffer to the NIC is performed by passing the corresponding host memory location pointer downward through the protocol stack of the host device from an application layer to the NIC, wherein the NIC is located below the protocol stack.

In an operation 403, the NIC is operated to place the incoming data packet in the posted application buffer. More specifically, the NIC performs a direct memory access operation to place the data received at the NIC in the host memory location corresponding to the posted application buffer. In an operation 405, the NIC is operated to prevent placement of data in a portion of the application buffer having incoming data previously placed therein by the NIC. Thus, the NIC is operated to restrict data writing to a forward direction. Also, in an operation 407, the protocol stack of the host device is operated to re-assume ownership of the portion of the application buffer within the host memory having data placed therein by the NIC. In the operation 407, ownership of the application buffer portion is re-assumed by the host device without actively reclaiming the application buffer portion from the NIC. The operation 407 is enabled by operating the host device to manage memory ownership on a byte-level.

Figure 5:
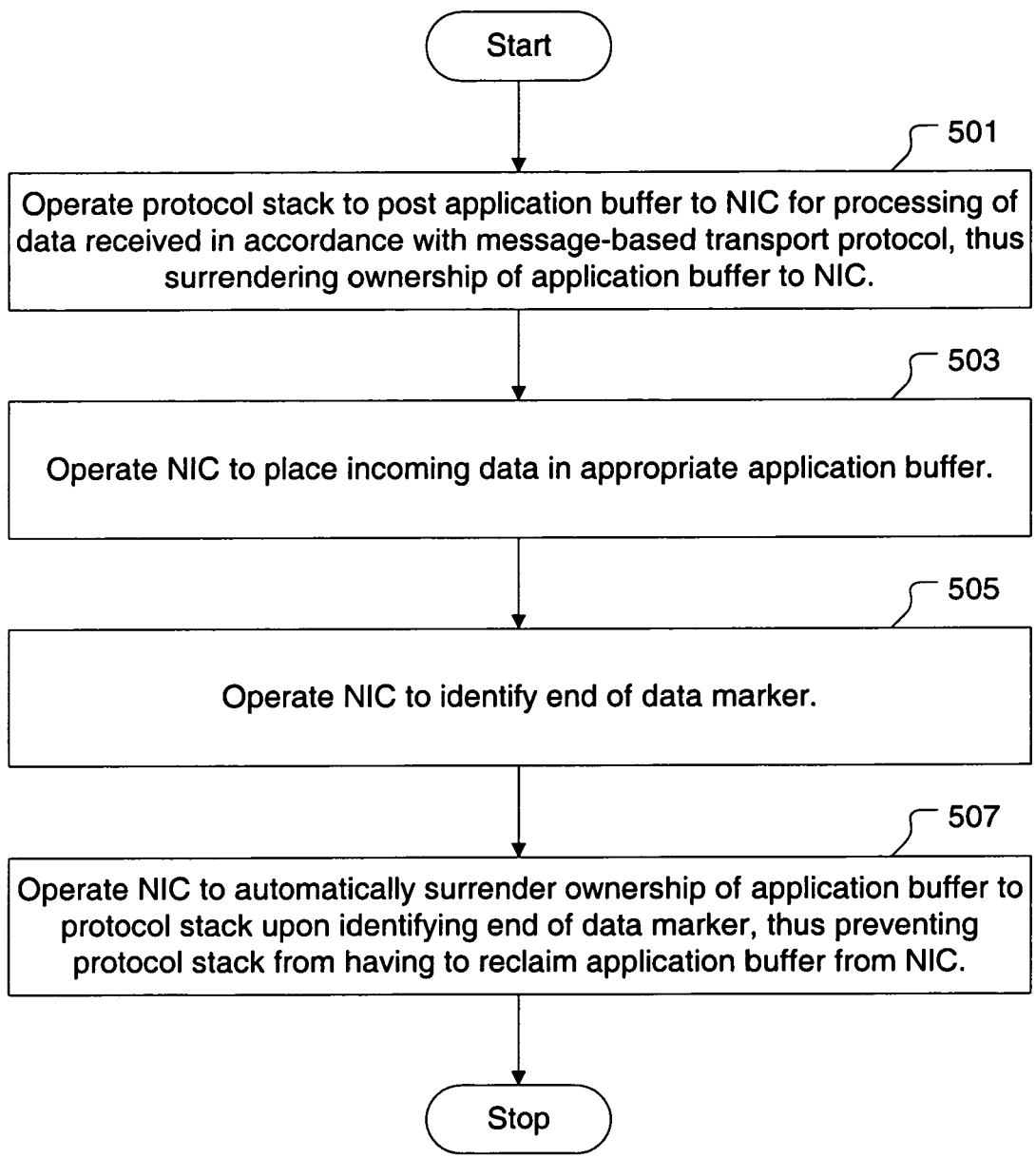
FIG. 5 is an illustration showing a flowchart of a method for receiving network communication in accordance with a message-based transport protocol, in accordance with one embodiment of the present invention.

FIG. 5 is an illustration showing a flowchart of a method for receiving network communication in accordance with a message-based transport protocol, in accordance with one embodiment of the present invention. In one embodiment, the message-based transport protocol is a user datagram protocol (UDP). The method includes an operation 501 in which a protocol stack of a host device operates to post an application buffer to a NIC, wherein the application buffer represents a pointer to a host memory location. In one embodiment, the application buffer is allocated by an application executing on the host device. The application buffer is to be used for processing a data packet to be received by the NIC in accordance with a message-based transport protocol. Posting of the application buffer serves to surrender ownership of the corresponding host memory location from the host device to the NIC. Also, posting of the application buffer to the NIC is performed by passing the corresponding host memory location pointer downward through the protocol stack of the host device from an application layer to the NIC, wherein the NIC is located below the protocol stack.

The method also includes an operation 503 in which the NIC is operated to place the incoming data in the host memory location corresponding to the pointer posted in the operation 501. In an operation 505, the NIC is operated to identify an end of data marker associated with the incoming data received at the NIC. Additionally, in an operation 507, the NIC is operated to automatically surrender ownership of the host memory location corresponding to the pointer posted in the operation 501, to the host device upon identification of the end of data marker in the operation 505. Thus, the host device avoids actively reclaiming ownership of the host memory location from the NIC.

Figure 6:
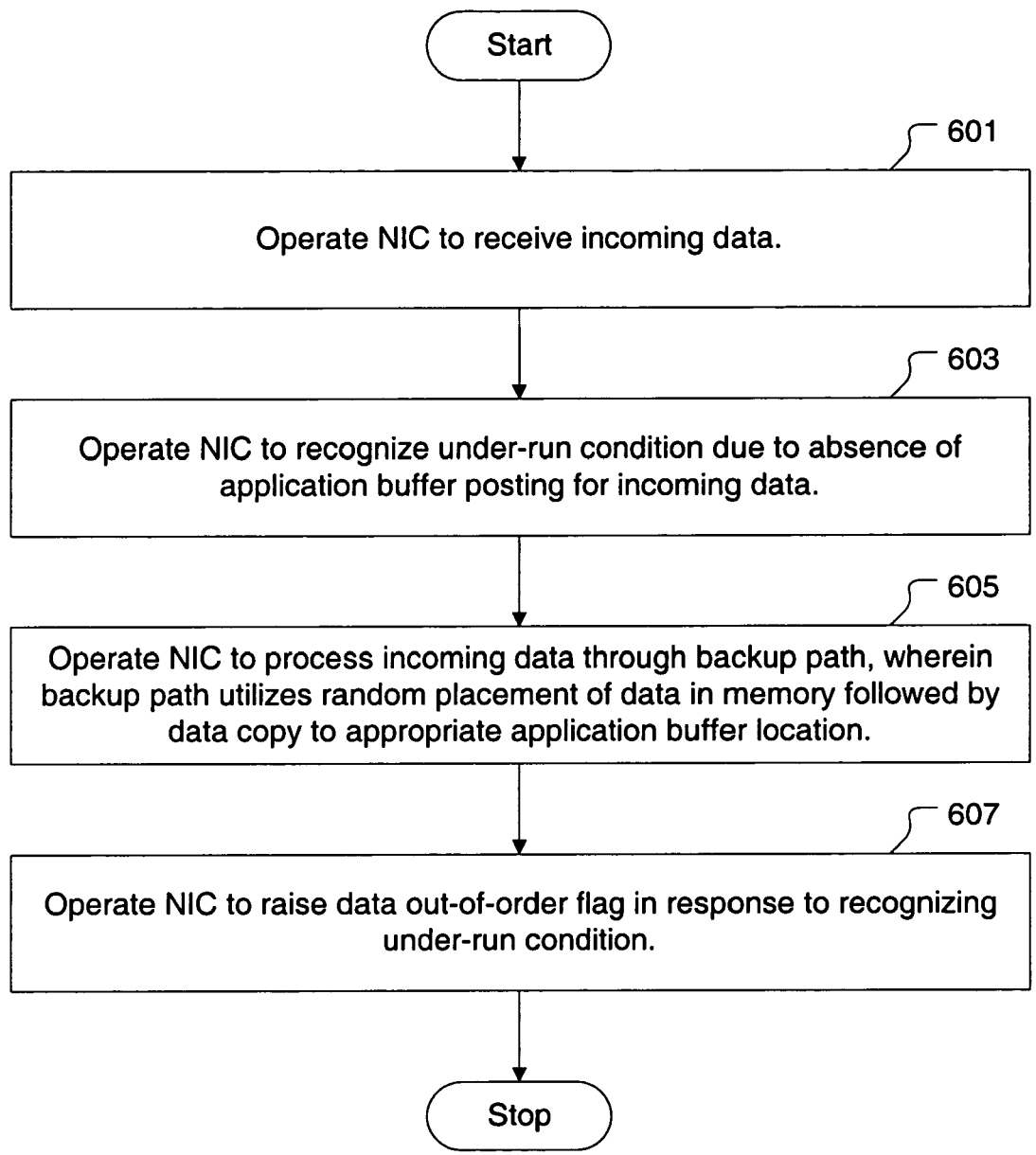
FIG. 6 is an illustration showing a flowchart of a method for handling an under-run condition at a receive side of a network communication, in accordance with one embodiment of the present invention.

FIG. 6 is an illustration showing a flowchart of a method for handling an under-run condition at a receive side of a network communication, in accordance with one embodiment of the present invention. The method includes an operation 601 for operating a NIC to receive incoming data from a network. In an operation 603, the NIC is operated to recognize an under-run condition due to an absence of an application buffer posting to be used for the incoming data. In an operation 605, the NIC is operated to process the incoming data through a backup path. The backup path includes placing the incoming data at a random memory location in the host memory, followed by copying the data from the random memory location to an appropriate memory location. In an operation 607, the NIC is operated to raise a data out-of-order flag in response to recognizing the under-run condition. The method can be extended to include operating the host device to resolve the out-of-order condition by ensuring that each data packet received at the NIC and placed in the host memory by the NIC is correctly located in the host memory.

Figure 7:
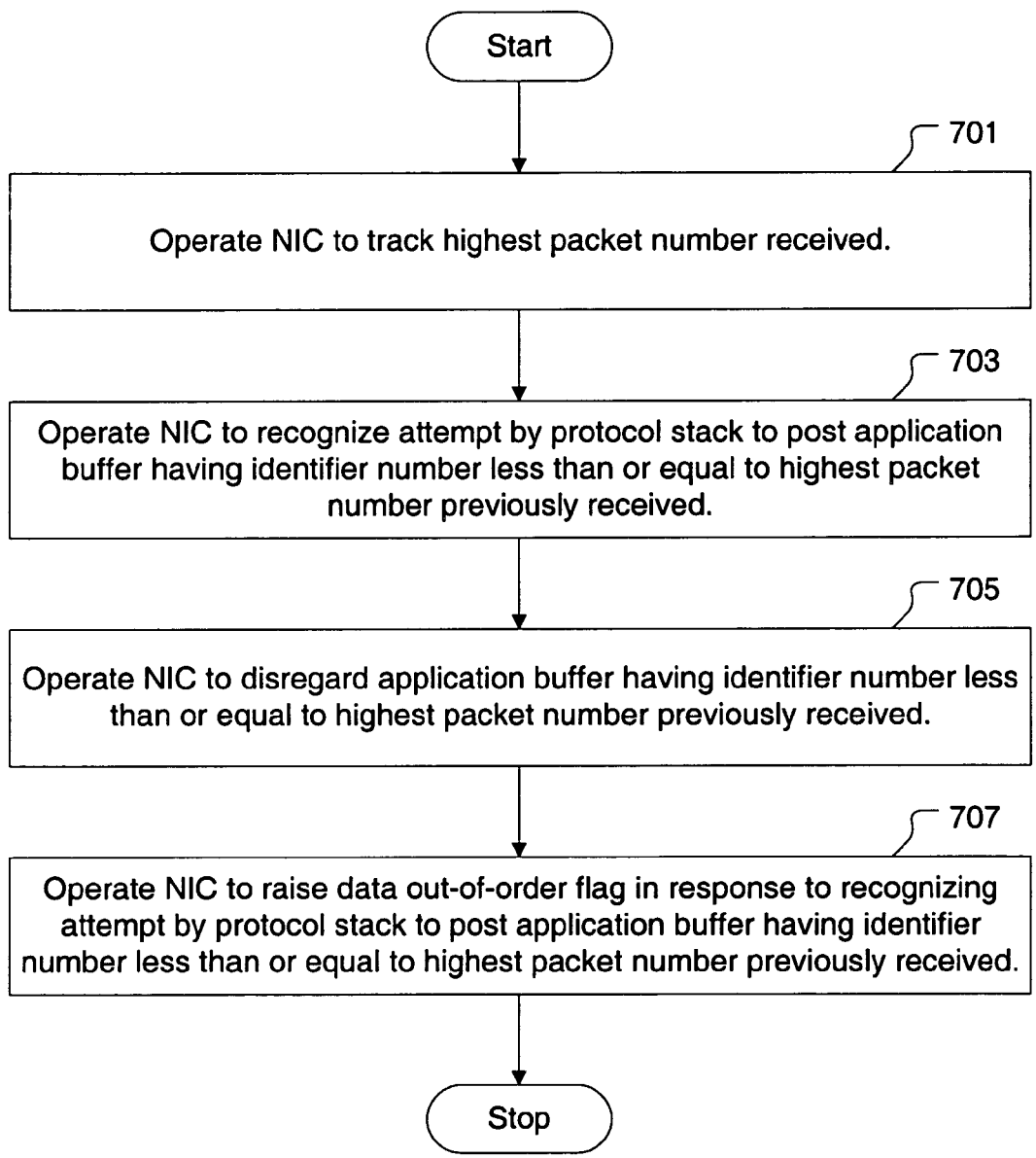
FIG. 7 is an illustration showing a method for receiving network communication, in accordance with one embodiment of the present invention.

FIG. 7 is an illustration showing a method for receiving network communication, in accordance with one embodiment of the present invention. The method includes an operation 701 in which a NIC is operated to track a highest data packet sequence number received. In an operation 703, the NIC is operated to recognize an attempt by a protocol stack of a host device to which the NIC is attached to post an invalid application buffer, i.e., memory location pointer, to the NIC. The invalid application buffer corresponds to a data packet sequence number that is less than or equal to the highest data packet sequence number received by the NIC. In an operation 705, the NIC is operated to disregard the recognized attempt by the host device to post the invalid application buffer. Thus, the NIC is operated to disregard the application buffer whose identifier is less than or equal to the highest data packet sequence number previously received by the NIC. In an operation 707, the NIC is further operated to set an out-of-order condition flag in response to recognizing the attempt by the protocol stack of the host device to post the invalid application buffer. The method can further include operating the host device to resolve the out-of-order condition by ensuring that each data packet received at the NIC and placed in the host memory by the NIC is correctly located in the host memory.

The method of FIG. 7 can be extended to include operating the NIC to recognize a received data packet as having an invalid sequence number, wherein the invalid sequence number is less than or equal to the highest data packet sequence number previously received by the NIC. Also, the NIC can be operated to place the received data packet having the invalid sequence number at a random memory location in the host memory. Then, the host device can be operated to copy the data packet having the invalid sequence number from the random memory location in the host memory to a required memory location. Additionally, the NIC can be operated to set an out-of-order condition flag in the host device in response to having recognized the received data packet as having the invalid sequence number. As previously mentioned, the host device can resolve the out-of-order condition by ensuring that each data packet is correctly located in the host memory.

It should be appreciated that the method described with respect to FIGS. 4 through 7 can be implemented separately or in combination with each other. Also, with respect to the method operations of FIGS. 4 through 7, it should be appreciated that the order in which the method operations are performed may vary from that specifically described herein. Additionally, the method operations can be performed in parallel.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for receiving network communication, comprising:

posting a host memory buffer pointer from a host device to a network interface card (NIC) attached to the host device prior to receipt of data at the NIC to be placed in the host memory buffer corresponding to the pointer, wherein posting the host memory buffer pointer serves to surrender ownership of the host memory buffer from the host device to the NIC, wherein a size of the host memory buffer is equal to a system page size and is not based on an amount of data to be received at the NIC;

placing data received at the NIC in the host memory buffer corresponding to the pointer; and operating the NIC in accordance with a byte-stream oriented transport protocol such that the NIC is operated to prevent placement of data in a portion of the host memory buffer having data previously placed therein by the NIC, and such that ownership of each byte of the host memory buffer is automatically returned from the NIC to the host device upon placement of data therein by the NIC.

2. A method for receiving network communication as recited in claim 1, wherein the host memory buffer is allocated by an application executing on the host device.

3. A method for receiving network communication as recited in claim 1, wherein posting the host memory buffer pointer to the NIC is performed by passing the host memory buffer pointer downward through a protocol stack from an application layer to the NIC, the NIC being located below the protocol stack.

4. A method for receiving network communication as recited in claim 1, wherein a direct memory access operation is performed to place the data received at the NIC in the host memory buffer corresponding to the pointer.

5. A method for receiving network communication as recited in claim 1, wherein operating the NIC to prevent placement of data in the portion of the host memory buffer having data previously placed therein includes operating the NIC to restrict data writing to a forward direction within the host memory buffer.

6. A method for receiving network communication as recited in claim 1, further comprising:
operating the host device to manage memory ownership on a byte-level to enable the host device to re-assume ownership of the portion of the host memory buffer having data placed therein by the NIC.

7. A method for receiving network communication in accordance with a message-based transport protocol, comprising:
posting a host memory buffer pointer from a host device to a network interface card (NIC) attached to the host device prior to receipt of data at the NIC to be placed in the host memory buffer corresponding to the pointer, wherein posting the host memory buffer pointer serves to surrender ownership of the host memory buffer from the host device to the NIC, wherein a size of the host memory buffer is equal to a system page size and is not based on an amount of data to be received at the NIC;
placing data received at the NIC in the host memory buffer corresponding to the pointer; and
operating the NIC in accordance with a message-based transport protocol such that the NIC is operated to identify an end of data marker associated with the data received at the NIC; and
operating the NIC to automatically surrender ownership of the host memory buffer to the host device upon identification of the end of data marker, whereby the host device avoids actively reclaiming ownership of the host memory location from the NIC.

8. A method for receiving network communication in accordance with a message-based transport protocol as recited in claim 7, wherein the message-based protocol is a user datagram protocol.

9. A method for receiving network communication in accordance with a message-based transport protocol as recited in claim 7, wherein the host memory buffer is allocated by an application executing on the host device.

10. A method for receiving network communication in accordance with a message-based transport protocol as recited in claim 7, wherein posting the host memory buffer pointer to the NIC is performed by passing the host memory buffer pointer downward through a protocol stack from an application layer to the NIC, the NIC being located below the protocol stack.

* * * * *